United States Patent [19]

Chapman

[11] 4,203,668
[45] May 20, 1980

[54] DIGITAL EXPOSURE METER

[75] Inventor: Darwin E. Chapman, Palo Alto, Calif.

[73] Assignee: Creative Phototronics, Inc., Mountain View, Calif.

[21] Appl. No.: 892,415

[22] Filed: Mar. 31, 1978

[51] Int. Cl.² .............................................. G01J 1/42
[52] U.S. Cl. .................................. 356/215; 356/224; 356/225
[58] Field of Search ................ 356/215, 219, 224, 225

[56] References Cited

U.S. PATENT DOCUMENTS

| 2,202,441 | 5/1940 | Bernhard et al. | 356/224 |
| 3,049,050 | 8/1962 | Thomas | 356/215 |
| 3,574,443 | 4/1971 | Nanba | 356/215 |
| 3,709,615 | 1/1973 | Blakeslee | 356/227 |

FOREIGN PATENT DOCUMENTS 870181 3/1942 France .................................... 356/225

OTHER PUBLICATIONS

Walter W. Schopp "Electronic Photo Flash Meter" Electronics World, vol. 83, No. 6, Jun. 1970, pp. 62-63.

*Primary Examiner*—Rolf G. Hille
*Attorney, Agent, or Firm*—Limbach, Limbach & Sutton

[57] ABSTRACT

The meter senses flashes of illumination, it converts the illumination to an electrical current whose magnitude is proportional to the intensity of the illumination; it integrates the current over a period of time corresponding to a selected shutter speed by charging a capacitor; it discharges the capacitor and measures the time required to do so; it converts the time required to discharge the capacitor into a corresponding signal representative of an appropriate camera aperture setting for a preselected film sensitivity and shutter speed via a microprocessor and a stored data program; and then displays the camera aperture setting on a multi-segment display. This process is repeated with each new flash of illumination automatically. The meter also measures multiple flashes and displays an accumulated camera aperture setting as well as the number of flashes needed to accumulate that setting.

19 Claims, 5 Drawing Figures

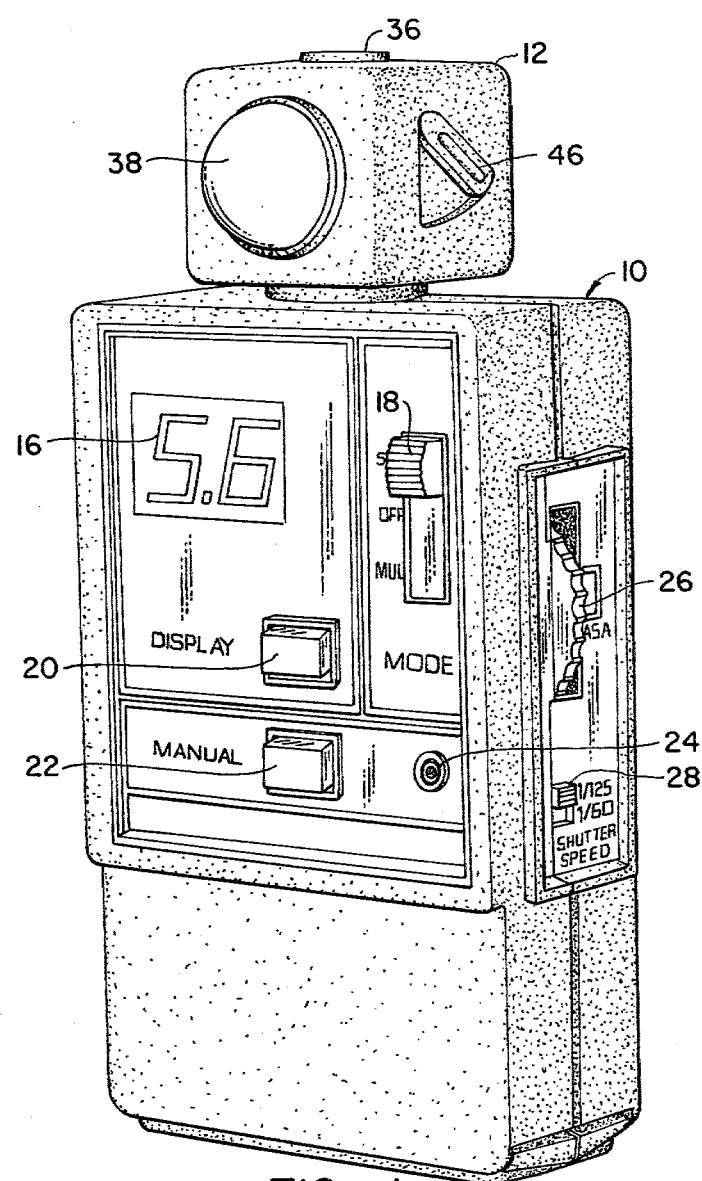
FIG._1.
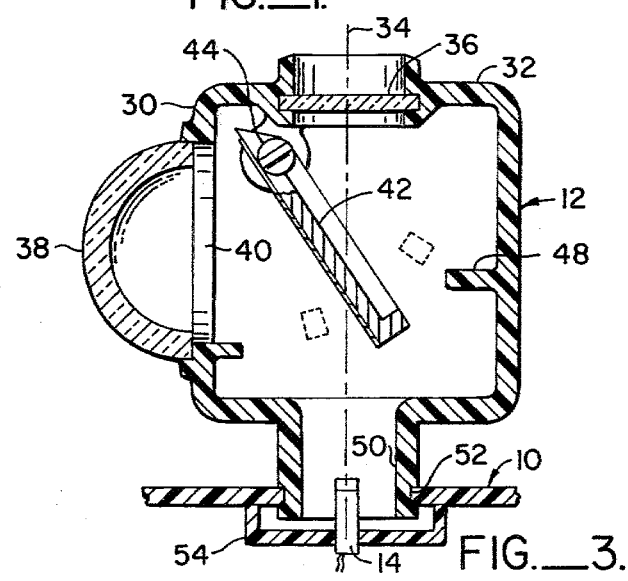
FIG._3.

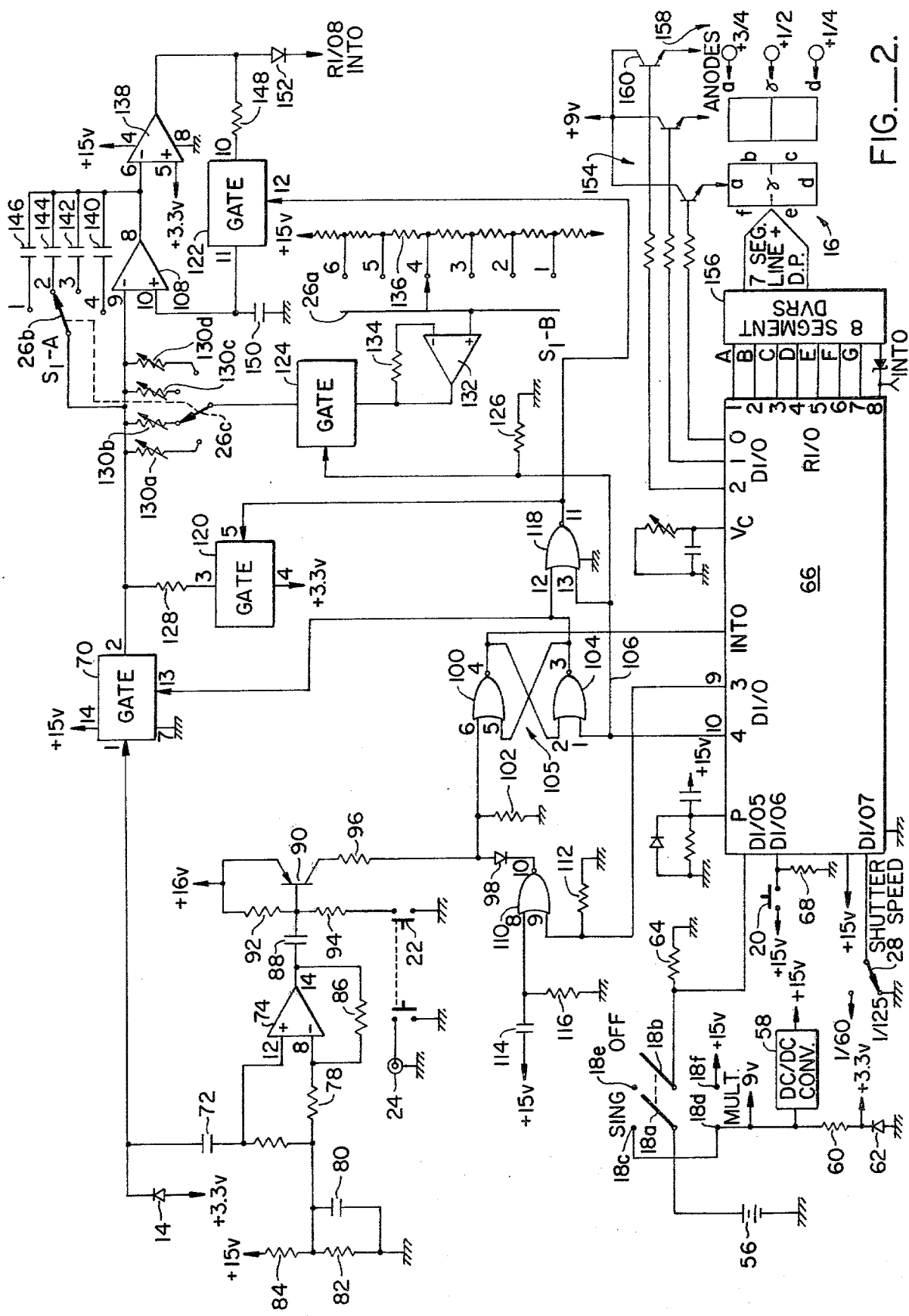
FIG._2.

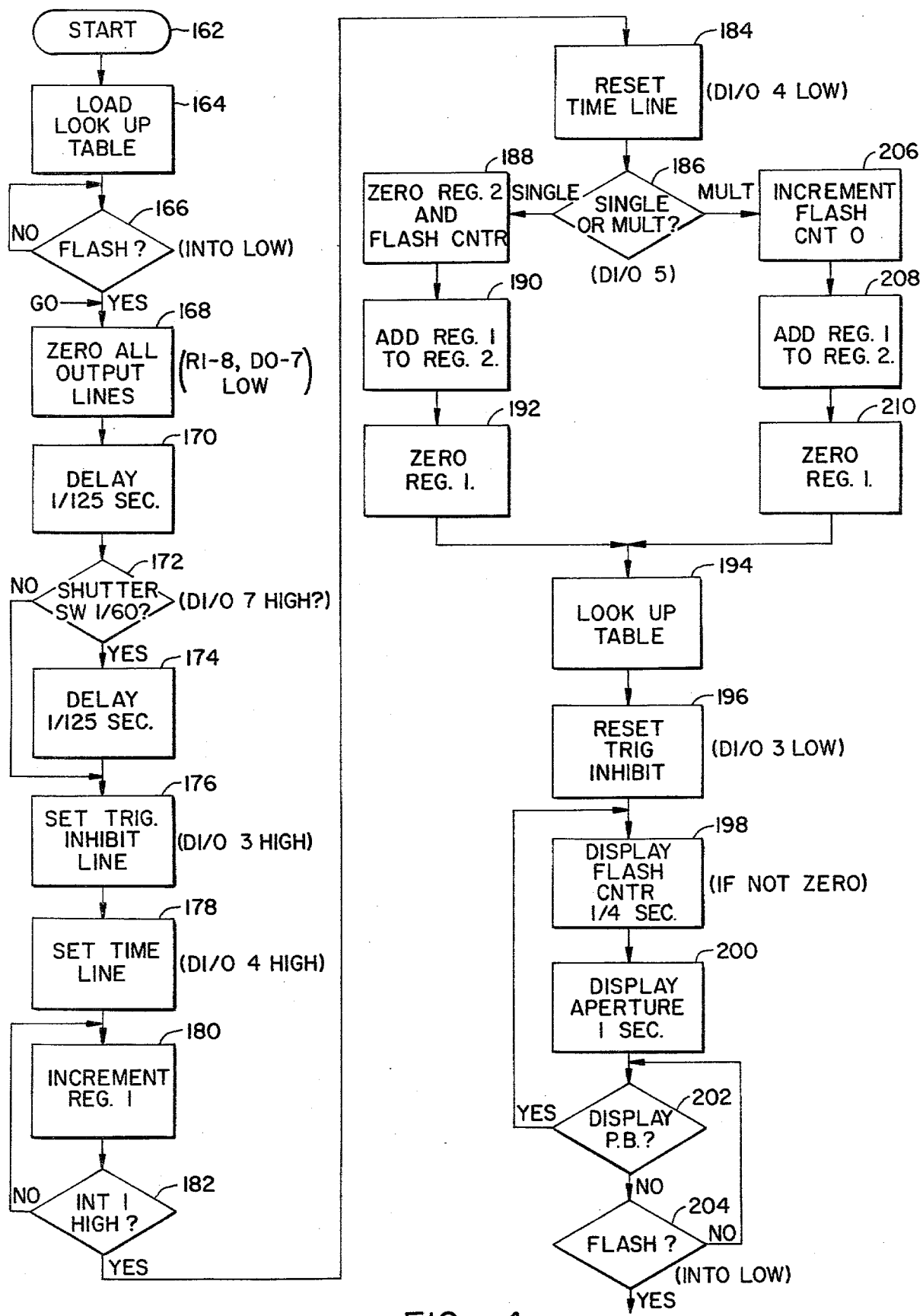
FIG._4.

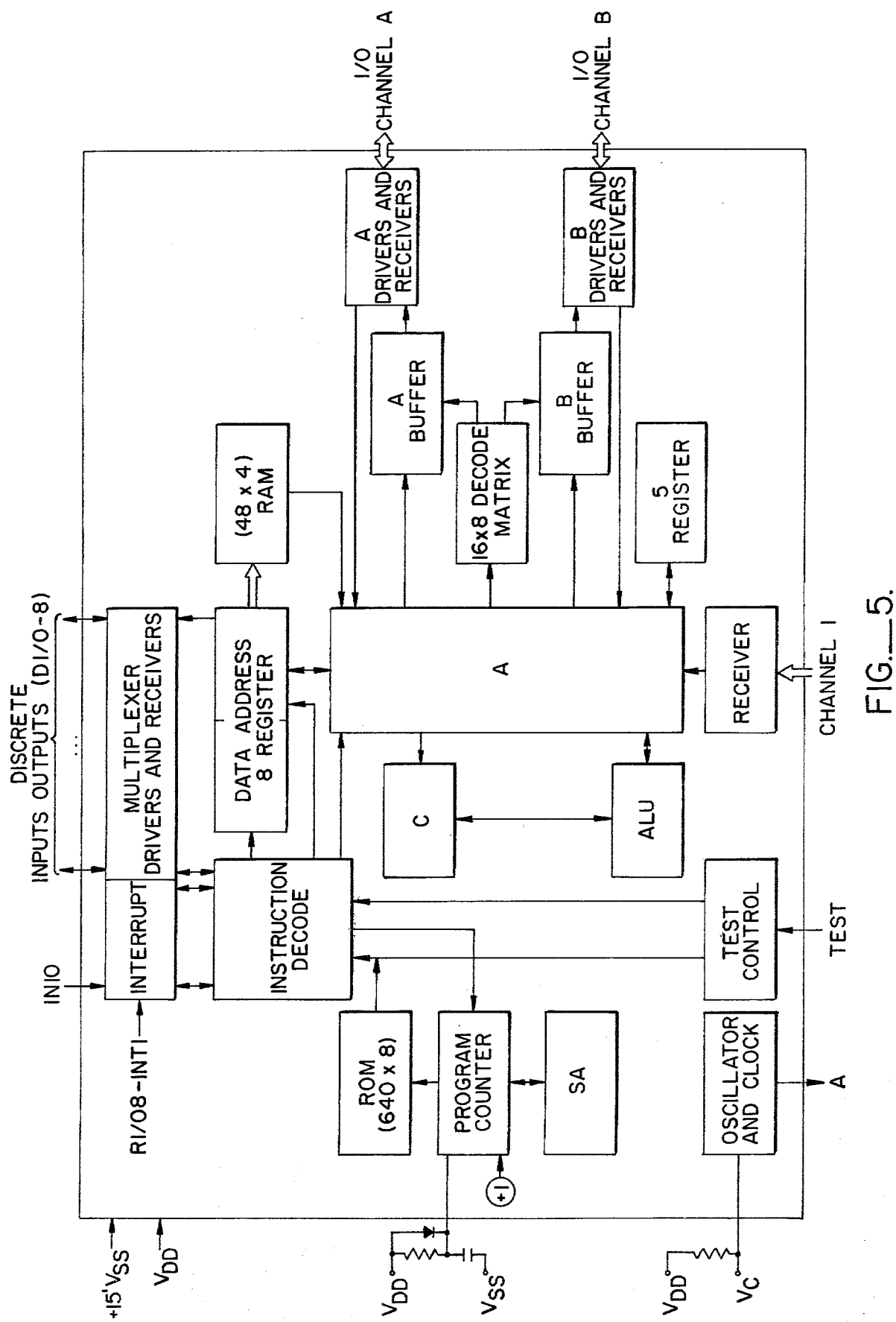
FIG._5.

4,203,668

DIGITAL EXPOSURE METER

BACKGROUND OF THE INVENTION

This invention relates to a photographic light exposure meter and more particularly to a digital exposure meter for reading either incident or reflected illumination produced by high-intensity strobotron lights together with ambient light.

In photographing a subject illuminated by electronic flash lighting, i.e., strobotron lighting, it is normally difficult to accurately determine the correct exposure for a given camera shutter speed and film light sensitivity, i.e., film speed. Because of the extremely short duration of the strobotron flash, special exposure meters are necessary to make this measurement. As a result, numerous exposure readings are often required in doing portraiture work. It is therefore desirable to shorten the process by which the correct exposure is determined in order to minimize the inconvenience to the photographic subject. To the extent that the prior art exposure meters require synchronization by means of cables with the light sources or manual readjustments and calculations to determine the correct exposure for a given lighting setting, they complicate and slow the process and are thus undesirable. This is particularly true where the exposure meter must be readjusted for each new change in the lighting situation.

Another problem is that in order to get good depth of field by using a relatively small aperture opening, it is sometimes necessary to repeatedly fire the electronic flash to provide sufficient exposure. While some prior art digital exposure meters will accumulate the overall exposure and give a combined digital reading for the correct aperture, none of these exposure meters also displays the number of flashes required to produce the accumulated aperture setting. An even more serious disadvantage of some of these prior art exposure meters is that with either single or multiple flashes, the flashes must all take place within a relatively short period of time after the meter has been manually activated in order for the exposure meter to correctly read the flashes.

Still another problem of all prior art digital exposure meters of which the applicant is aware, is that the display is relatively small, due to the power limitations of a battery-operated exposure meter, so that the photographer must approach the subject closely in order to determine the correct reading. Also, the exposure meter must be reset manually after each flash reading, except in the multiple flash mode.

One of the more technical disadvantages of some prior art digital exposure meters lies in the circuit design. In this prior art circuit, the photo-optic sensor produces an electrical signal whose voltage is proportional to the intensity of the illumination. The voltage signal is amplified through an operational amplifier and is passed through a resistor to produce a current which is integrated by charging a capacitor. This prior art circuit design introduces a number of manufacturing problems. One problem is that operational amplifiers which do not introduce a voltage off-set, a necessary condition of the circuit design, are extremely expensive. Another problem is that they introduce quality control problems in manufacturing. Still another problem is that with electronic flash equipment in which the duration of the flash is automatically controlled by the flash unit, the intensity of the flash is extremely high and the duration may vary between 1/500 of a second and 1/30,000 of a second. With such high-intensity equipment, many prior art photo-optic sensor systems saturate and do not fully integrate the sensor signal during the first part of the flash, thereby producing inaccurate readings.

SUMMARY OF THE INVENTION

The foregoing and other disadvantages of prior art digital light exposure meters are overcome by the present invention of a digital exposure meter comprising a photo-optic sensor for detecting light and generating an electrical current signal whose magnitude is proportional to the intensity of the detected illumination. An integrating circuit receives the sensor current and applies a current, which is directly proportional to it, to a capacitor during a preset time period corresponding to a selected shutter speed.

Under the control of a microprocessor, the capacitor is then discharged and the time required to discharge the capacitor is measured by a clock pulse generator and counter within the microprocessor. A read-only memory within the microprocessor, together with instruction memories and registers, correlates the counts in the clock pulse counter with corresponding discrete, stored display instruction signals which represent appropriate camera aperture settings for the count in the counter. A display operated by the microprocessor in accordance with the display instruction signals presents a graphic indication to the photographer of the correct aperture setting corresponding to the count in the clock pulse counter which, in turn, represents the light exposure.

The digital exposure meter of the present invention is automatically actuated by sensing a sudden change in the magnitude of the sensor signal current caused by an intense, short burst of illumination. This sensing is done by a triggering circuit which thereupon produces a control signal. The integrating circuit includes logic circuitry supplied with the control signal for initiating the charging of the capacitor. The microprocessor is also connected to the triggering circuit and supplies an inhibiting signal to it to prevent the generation of subsequent control signals until after the integrating capacitor is discharged and the correct aperture reading is determined by the microprocessor. This prevents the exposure meter from being confused by the occurrence of two flashes within a short time period.

In the digital exposure meter of the invention, a plurality of integrating capacitors is provided together with means for selecting one of the capacitors to be charged by the applied integrating current. Means are also provided for selecting one of several reverse biasing voltages and applying it across the charged capacitor to discharge it. The polarity of the biasing voltage is opposite to the polarity of the charged capacitor. Each combination of a selected discharging bias voltage and a selected integrated capacitor corresponds to a discrete film sensitivity, i.e., a particular film speed. By changing the discharge voltage applied to the capacitor, and by changing the capacitor which is to be charged, the digital exposure meter determines the correct exposure based on different film speeds.

Thus, it can be seen that the digital exposure meter of the present invention is automatically activated by the flashing of the strobotron lighting. Furthermore, the metering is automatically repeated with each new flash of illumination without having to manually reset the exposure meter. With each new flash, the meter displays the new aperture reading corresponding to the level of illumination which the meter has just sensed. The meter display digits are at least one-half inch wide by one-half inch high to enable the photographer to read the meter from at least twenty feet away.

As an example of the operation of the meter, the photographer can place it in the photographic subject's hand and then trigger the electronic flash lighting arrangement. If the camera aperture reading which is then displayed by the meter is not to the photographer's liking, the photographer can vary the lighting arrangement, refire it, and take a new reading without touching the exposure meter again. This greatly facilitates the taking of the subject's portrait, and inspires a greater confidence in the photographer on the part of the subject.

To read multiple flashes of illumination and to give a combined camera aperture setting, the exposure meter of the present invention is provided with a switch which can be manually set in either a single mode or a multiple mode. When the switch is set in the single mode, it causes the microprocessor to extinguish the previous count in the clock pulse counter with the generation of a new control signal by the trigger circuit. Each time a new flash of illumination occurs, the count in the clock pulse counter is extinguished and a new count is introduced corresponding to the newly measured illumination intensity. Thus, the exposure reading will not accumulate with each new flash.

When the switch is set in the multiple mode, it causes the microprocessor to accumulate the count in the counter with each one of a series of illumination flashes. The display is caused by the microprocessor to display an aperture setting which is appropriate for the total of the illumination flashes as represented by the accumulated total in the counter. The microprocessor also includes a flash counter which is incremented by one each time a control signal is generated by the trigger means. The microprocessor instructs the display to show both the accumulated aperture setting and the count in the flash counter so that the photographer knows how many flashes were required to produce the accumulated aperture setting. In the preferred embodiment of the invention, the display presents the flash count number first and then the accumulated aperture setting.

The exposure meter of the invention is capable of reading both incident and reflected light. The sensor is designed to detect light principally along one axis. A housing enclosing the sensor has one side wall parallel to the light detection axis, and an end wall which is perpendicular to it. A light diffuser window is provided in the side wall for allowing incident light to enter the housing. A neutral density filter-window is provided in the end wall and is aligned with the light detection axis to allow reflected light to pass through and strike the sensor directly.

A mirror, for determining whether incident or reflected light is detected, is hinged within the housing and is movable between a first position in which it blocks incident light from entering through the light diffuser and a second position in which it blocks reflected light from entering through the filter-window. When the mirror is in the second position it also reflects light entering the housing through the light diffuser to the sensor. An arm for moving the mirror from the first to the second position protrudes through the housing to the exterior. In order to enhance the hands-free operation of the exposure meter, the housing is rotatable about the light detection axis so that, when in the incident light reading mode (i.e., the mirror is in the second position), the light diffuser can be pointed at the source of light while the display of the exposure meter faces the photographer in a different direction.

It is therefore an object of the present invention to provide a digital exposure meter which is activated repeatedly and automatically with each flash of illumination.

It is another object of the invention to provide a digital exposure meter in which the aperture setting corresponding to the meter reading of the illumination is visible from at least twenty feet away.

It is still another object of the present invention to provide a digital exposure meter which automatically accumulates measurements for a series of flashes of illumination, displays the accumulated aperture setting for those flashes, and further displays the number of flashes of illumination necessary to produce the exposure corresponding to the displayed aperture setting.

The foregoing and other objectives, features and advantages of the invention will be more readily understood upon consideration of the following detailed description of certain preferred embodiments of the invention, taken in conjunction with the accompanying drawings.

BRIEF DESCRIPTION OF THE DRAWINGS

FIG. 1 is a generally vertical, perspective view of the digital exposure meter according to the invention;

FIG. 2 is a schematic circuit diagram of the digital exposure meter according to the invention;

FIG. 3 is a vertical, sectional view of the sensor housing of the digital exposure meter depicted in FIG. 1;

FIG. 4 is a flow chart of the digital operation of the digital exposure meter; and FIG. 5 is a block diagram of the microprocessor used in the digital exposure meter.

DETAILED DESCRIPTION OF THE PREFERRED EMBODIMENT

Referring now more particularly to FIG. 1, the digital exposure meter according to the invention is illustrated as having a generally rectangular case 10. At the upper end of the case 10, as viewed in FIG. 1, is a rotatable housing 12 which encloses a photo-optic sensor 14 (see FIG. 3). On the face of the housing 10 is a digital display 16 which can be, for example, a standard, eight-segment electro-luminescent display of the type well known for its use in calculators and the like. Also on the housing face is a sliding switch 18 for selecting between the single and multiple modes of exposure determination as well as an off position intermediate to the single and multiple modes. Still another switch on the face of the housing 10 is a push button display switch 20 which, when depressed, causes the display 16 to be activated for approximately one second. Depressing the display button also resets the digital exposure meter for the next exposure reading.

There are still further features on the housing face 10 which include a manual push button switch 22 which, as will be explained in greater detail hereinafter, when depressed activates the digital exposure meter to take a reading. Adjacent to the manual switch 22 is a PC cord socket 24 into which electronic flash lighting equipment can be plugged. When the manual button 22 is pressed, the lighting equipment connected through socket 24 to the digital exposure meter will be energized.

On the housing's left side, as viewed in FIG. 1, is a rotary switch 26 for selecting the appropriate film speed (ASA setting). Beneath the ASA switch 26 is a sliding switch 28 for setting the desired shutter speed. In the preferred embodiment, the shutter speeds can be chosen between 1/60th of a second and 1/125th of a second. As was noted above, the setting of the switch determines the period of time over which the digital exposure meter measures the intensity of the illumination on the photographic subject.

Referring now more particularly to FIGS. 1 and 3, the housing 12 for the light sensor 14 will be explained in greater detail. The sensor housing 12 is basically cubic in shape, having a plurality of side walls 30 and a top end wall 32. The light sensor 14 detects light principally along an axis 34 which is oriented perpendicular to the end wall 32 and parallel to the side walls 30.

A neutral density filter-window 36 is positioned in the end wall 32 centered on the axis 34 and perpendicular to it. The window 36 admits reflected light to the sensor 14 while reducing the amount of light reaching the sensor by a factor of ¼ to ⅛, corresponding to two to three camera aperture f-stops, depending on the circuitry. A hemispherical diffuser dome 38 is attached to the exterior of one of the side walls 30 over a hole 40 for admitting incident illumination into the sensor housing 12.

In order to control whether incident or reflected light is reaching the sensor 14, a flat mirror 42 is hinged at its upper left end, as viewed in FIG. 3, by a hinge 44 attached to the housing 12, so that it can be swung from a first position at which it covers the hole 40 in the side wall 30 to a second position at which it abuts a stop 48 protruding perpendicularly from the side wall opposite the hole 40. In the second position, light entering the housing through the window 36 is blocked and light entering the housing through the spherical diffuser dome 38 is reflected from the mirror 42 to the sensor 14. Thus, the mirror 42 in the second position is at an angle of approximately forty-five degrees to the light detection axis 34 and the sidewall 30 having the hole 40. The side of the mirror 42 facing the window 36 is opaque and light-absorbing. As best viewed in FIG. 1, the mirror is pivoted between the first and second positions by a handle 46 which is attached to the mirror 42 at the hinge point 44 and protrudes through one of the sidewalls 30 to the exterior of the housing 12.

When the digital exposure meter is used in the reflected light mode, i.e., the mirror 42 is swung to the first position in which it closes off the hole 40, the meter is usually hand-held horizontally at camera level and is pointed toward the subject. The meter is triggered manually by depressing the switch 22, although it also can be triggered automatically by setting off the electronic flash separately. When the meter is used in the incident light mode, it is usually operated automatically and is placed, facing the camera, upright at or near the photographic subject. Because the photographer desires to be able to see the display 16 at a distance from the subject and may be observing the scene from a position which is not directly behind the camera, it is desirable that the housing 12 be pivotable about the axis 34 so that the diffuser window 38 can face the camera while the display 16 faces the photographer. To allow this, an inwardly-directed annular groove 50 is provided at the bottom of the casing 12 coaxially with the light detection axis 34. The groove 50 mates with the edge 52 of an annular hole in the upper end of the casing 10 surrounding the sensor 14. The sensor 14 is mounted in a wall segment 54 of the housing 10 along the light detection axis 34.

Referring now more particularly to FIG. 2, the details of the digital exposure meter circuitry will be discussed. It is powered by a single nine volt battery 56 whose cathode is connected to the circuit ground and whose anode is connected to the pole terminal 18a of the double pole, double throw switch 18. As discussed above, the switch 18 is for the purpose of switching between a single flash mode, an off mode, and a multiple flash mode. Both of the corresponding throw terminals 18c and 18d are connected to the input of a DC/DC converter 58. The output of the converter 58 is +15 volts DC. The terminals 18c and 18d are also connected through a resistor 60 to the cathode of a zener diode 62 whose anode is connected to the circuit ground. The diode 62 has a breakdown voltage of 3.3 volts, and a 3.3 volt positive supply is tapped from its cathode. A positive nine volt power tap is taken from the terminals 18c and 18d. Henceforth in the description, when it is designated that a portion of the circuit is supplied with +3.3 volts, +9 volts or +15 volts, it will be understood that these voltages are taken from the foregoing taps.

The second pole 18b of the switch 18 is connected through a resistor 64 to the circuit ground and is also connected directly to a terminal DI/05 of a microprocessor 66. The microprocessor is a type MM75, manufactured by North American Rockwell Corporation. The contact 18e for the pole 18b of the switch 18 is unconnected. The opposite contact 18f is supplied with +15 volts. The contacts of the switch 18 are arranged such that 18c and 18e are contacted by the poles 18a and 18b, respectively, when the switch is thrown in the single mode. The contacts 18d and 18f are connected to their respective poles 18a and 18b when the switch is thrown in the multiple mode. In the intermediate, off mode, the poles 18a and 18b are unconnected.

The switch 20 is connected in series between the +15 volt supply and an input terminal DI/06 of the microprocessor 66. The terminal DI/06 is also connected through a resistor 68 to the circuit ground. The pole terminal of the single pole, double throw shutter speed switch 28 is connected to an input terminal DI/07 of the microprocessor 66. The contact at the switch 28 corresponding to the 1/125th of a second position is connected to the circuit ground. The contact of the switch 28 corresponding to the 1/60th of a second position is connected to the +15 volt supply.

Referring to the upper left hand portion of FIG. 2, the sensor 14 is comprised of a light-sensitive diode 14 whose anode is connected to the +3.3 volt supply. The cathode of the diode 14 is connected to the input of a first gate 70 and also through a capacitor 72 to the positive input of a differential amplifier 74. The positive input of the amplifier 74 is also connected through a resistor 76 and a resistor 78 in series with resistor 76 to the negative input of the amplifier 74. The intermediate connection between the resistors 76 and 78 is connected to the circuit ground by a capacitor 80 in parallel with a resistor 82. The connection between the resistors 76 and 78 is also connected through a resistor 84 to a +15 volt supply.

As will be explained further in this application, in describing the operation of the digital exposure meter of the invention, prior to the receipt of a flash, while the digital exposure meter is in its zeroing mode, the gate 70 has a high throughput impedance corresponding to an open circuit switch. When the diode 14 senses a flash of high intensity illumination it produces a negative-going pulse through the capacitor 72 to the positive input of the amplifier 74. In order to make the digital exposure meter relatively non-responsive to sudden increases in the sensed illumination which do not correspond to strobotron flashes, such as when the room lights are turned on, the capacitors 72 and 88, and the resistors 76 and 92, form a low frequency RC network which effectively blocks such slow-rising sensor signals, and prevents the operational amplifier 74 from triggering the remaining circuitry.

The output of the amplifier 74 is connected through a feed-back resistor 86 to the negative input terminal of the amplifier 74. The output of the amplifier 74 is also connected through a capacitor 88 to the base terminal of a PNP transistor 90. The emitter terminal of the transistor 90 is connected to the +15 volt supply. The base terminal of the transistor 90 is connected through a resistor 92 to the +15 volt supply, and through a resistor 94 in series with the manual, push-button switch 22 to the circuit ground.

The collector terminal of the transistor 90 is connected through a resistor 96 to the anode of a diode 98. This anode is also connected to one input of a NOR gate 100. This same input is connected to the circuit ground through a resistor 102. The NOR gate 100 is interconnected with a second NOR gate 104 in such a fashion that the two NOR gates constitute a set/reset flip-flop 105. The anode of the diode 98 is, therefore, connected to the set input of the flip-flop 105. The output of the NOR gate 100 is connected to one input of the NOR gate 104 and the output of the NOR gate 104 is connected to the other input of the NOR gate 100. The other input of the NOR gate 104, corresponding to the reset terminal of the flip-flop 105, is connected to an output terminal DI/04 of the microprocessor 66, as well as to a time-line 106. The output of the NOR gate 100 is further connected to a terminal INT0 of the microprocessor 66. The output of the NOR gate 104 is connected to the control input of the gate 70.

In operation, when the diode 14 detects a flash of high-intensity illumination and produces a triggering pulse which is amplified through the amplifier 74 and inverted by the transistor 90 to be applied to set the flip-flop 105, the output of the NOR gate 104 goes to a logic high and causes the gate 70 to become conductive. This transmits the signal from the diode 14 through to the negative input of a differential amplifier 108. As will be explained further hereinafter, the amplifier 108 performs an integrating function for the diode signal.

At this point it should be noted that in contrast to prior art electronic exposure meters, wherein the photo-sensor produces an output voltage signal whose magnitude is proportional to the light intensity, the diode 14 produces an output current whose magnitude is proportional to the light intensity. It is this current which is then fed directly to the integrating circuit. In prior art circuits of this type, an operational amplifier and a resistance are connected in series between the sensor and the integrating circuit. This introduces numerous problems of nonlinearity and voltage offsets, which greatly complicate the response of the circuit and add to its expense. As mentioned earlier in the application, such operational amplifiers can become saturated when the sensed light intensity is of an extremely short duration and high magnitude, and thus the circuit can not make a correct reading.

Proceeding with the basic description of the present circuit construction, the cathode of the diode 98 is connected to the output of NOR gate 110. One input of the NOR gate 110 is connected to an output terminal DI/03 of the microprocessor 66. This same terminal is also connected to the circuit ground through a resistor 112. The other input to the NOR gate 110 is connected through a capacitor 114 to the +15 volt supply. It is also connected through a resistor 116 to the circuit ground.

The purpose of the NOR gate 110 and its associated circuitry is to provide a trigger-inhibit signal to the triggering circuit discussed above in reference to the flip-flop 105 and the amplifier 74. During the time that the exposure monitor is processing input information from the sensor 14, it is necessary to prevent subsequent signals from being processed on top of the first signal. One reason this is necessary is that if a subsequent flash of illumination should come shortly enough after a first flash, the triggering circuit would then cause the digital exposure meter to completely recycle and to effectively dump the partially-integrated value and give an incorrect reading on the subsequent flash.

To prevent this, during the time the digital exposure meter of this invention is processing a signal, the microprocessor outputs a trigger-inhibit signal through its terminal DI/03 to one input of the NOR gate 110. The combination of the resistor 116 and the capacitor 114 acts as an artificial trigger-inhibit signal when the meter's power is first applied, allowing all the circuit voltages to become stabilized. With the output of the trigger inhibit signal from the NOR gate 110, the diode 98 becomes forwardly biased and effectively shunts any further trigger signals from the amplifier 74 to the circuit ground. The flip-flop is thereby prevented from being set again, after having been reset, until the cessation of the trigger inhibit signal.

It should also be noted that by closing the manual, push-button switch 22, the base of the transitor 90 is supplied with an artificial trigger signal which sets the flip-flop 105 and makes the gate 70 conductive. The manual trigger switch 22 has a second pair of contacts and a pole which short the connections within the PC socket 24 to fire the strobotron lighting which is plugged into the socket 24.

The output from the NOR gate 104 is also connected to one input of a NOR gate 118 whose output is connected to the control inputs to a second gate 120 and a fourth gate 122. The control input of the third gate 124 is connected to the line 106 which is also connected to the other input of the NOR gate 118. It should be noted that during the integration of the sensor signal and during the correlation process in the microprocessor the output of the NOR gate 118 is a logic low to turn off the gates 120 and 122. The control of the gate 124 is via the microprocessor through its output terminal DI/04. Line 106 is also connected to the circuit ground through a resistor 126.

The gate 120 is connected in series with a resistor 128 between the +3.3 volt supply and the negative input to the differential amplifier 108. As will be explained hereinafter, during the period when the digital exposure meter is awaiting a flash of illumination, the gate 120 is conductive and places the integrating circuit in a zeroing mode. The gate 124 is connected through a select one of four variable, calibrating resistances 130a through 130d, inclusive, to the negative input to the differential amplifier 108. The output of the differential amplifier 108 is connected to the negative input of a differential amplifier 138, and to the end leads of four separate integrating capacitors 140, 142, 144 and 146. The other ends of the capacitors 140 through 146, inclusive, are connected to separate contacts of a rotary switch portion 26b of the film selectivity switch 26. The rotary contact of the switch 26b is connected to the negative input of the differential amplifier 108. The selection of the resistances 130a, 130b, 130c or 130d is made by a rotary switch 26c whose rotary contact is ganged with the rotary contact of the switch 26b. Thus, in the first position of the switches 26b and 26c, the capacitor 146 is connected in series with the calibrating resistance 130a. In the next switch position (as shown) the capacitor 144 is connected in series with the calibrating resistance 130b, and so forth.

The side of the gate 124, opposite to the switch 26c, is connected to the output of a differential amplifier 132 whose negative input is connected to its output by a feed-back resistor 134. In this configuration the amplifier 132 provides unity gain and constitutes a low internal impedance voltage source as seen by the gate 124. The magnitude of the voltage source supplied by the amplifier 132 is determined by its positive input which is connected to the moving contact of a portion 26a of the film speed selectivity switch 26.

A voltage divider network 136 is connected between the +15 volt supply and the +3.3 volt supply. The voltage divider network has six taps which are connected to six separate corresponding taps on the switch portion 26a. Thus, the position of the moving contact of the switch portion 26a determines what voltage is supplied to the gate 124.

It should be understood that the switch portions of 26a, 26b and 26c are combined in a single switch which, when rotated, presents discrete combinations of bias voltages, from the divider network 136, and individual resistance calibrated feed-back integrating capacitors 140–146. Thus, there are twenty-four different combinations of bias voltages and calibrated integrating capacitors. As will be explained later in this application, these twenty-four possible combinations correspond to film speed settings between ASA 25 and ASA 5000 in twenty-four increments.

The positive input terminal for the differential amplifier 138 is connected to the +3.3 volt supply. The output of the differential amplifier 138 is connected through a resistor 148 in series with the gate 122 to the positive input to the differential amplifier 108. The positive input to the differential amplifier 108 is also connected to the circuit ground through a large capacitor 150, having a value of, for example, 4.7 microfarads. The output of the differential amplifier 138 also is connected to the anode of a diode 152 whose cathode is connected to the microprocessor input terminal RI/08 (INT 1).

The display 16 is operated by a transistor driver circuit 154 connected to the microprocessor output lines DI/01 and DI/00. The particular segments of the display 16 which are energized are controlled through eight output lines RI/01 through RI/08, by means of eight segment drivers 156. Since these display functions are well known to those skilled in the art, they will not be described in further detail; it being understood that they are conventional in every respect. The microprocessor output DI/02 is used to control one of three light-emitting diodes 158 which indicate quarter f-stops by being energized by a separate transistor driver 160 acting in conjunction with the segment drivers 156.

In operation, the user of the digital exposure meter sets the shutter speed switch 28 to either the 1/60th of a second or the 1/125th of a second position which either grounds the input terminal DI/07 or supplies it with +15 volts. The microprocessor is programmed to note this difference as it periodically scans its inputs, and to proceed accordingly. Prior to the reception of a flash of intense illumination by the sensor 14, the gate 70 is open-circuited, the gate 120 is conductive, the gate 124 is an open circuit, and the gate 122 is a closed circuit (The control of the gates has been explained previously.) In this quiescent, zeroing state, the 3.3 volt bias through the gate 120 is supplied to the input of the differential amplifier 108. The amplified output from the differential amplifier 108 passes through the amplifier 138 which also produces a 3.3 volt output. This 3.3 volt output is then passed through the gate 122 to charge the capacitor 150 to 3.3 volts plus or minus the voltage offsets of the operational amplifiers 108 and 138. The capacitor 150 provides, in effect, a temporary voltage bias for the amplifier 108 when the gate 122 becomes nonconductive during the integration process and eliminates voltage offset problems.

When the light sensitive diode 14 detects a sharp increase in the illumination, the triggering signal is generated as described above, causing the gate 70 to become conductive and the gates 120 and 122 to become nonconductive. The gate 124 is also made nonconductive by means of a signal from the microprocessor 66 over the line 106. The microprocessor knows that the trigger signal has been received through its input terminal INTO connected to the output of the NOR gate 100. As the cathode of the diode 14 tries to become more negative than its anode, due to the photo-optic generation of electricity, the amplifier 108 produces an output which becomes more positive and provides a current to the selected capacitor 140–146 to charge it and to drive the negative input to the amplifier 108 to remain at 3.3 volts.

The amplifier 108 thus supplies an integrating current which duplicates the current from the diode 14 in magnitude to charge one of the capacitors 140–146 as selected by the position of the switch 26b. The output of the amplifier 138 goes to the most negative value in the circuit. The capacitor 150 provides a +3.3 volt bias to the input of the amplifier 108.

With the expiration of the 1/60th of a second or 1/125th of a second time period as determined by the shutter speed switch 28, the microprocessor outputs a signal on its terminal DI/04. The determination of the shutter speed period is, of course, done within the microprocessor by an internal clock operation. This will be explained in further detail in reference to FIG. 4, a flow chart of the programming of the microprocessor. The signal output on the terminal DI/04 is supplied to reset the flip-flop 105 and thus to make the gate 70 nonconductive and, via the line 106, and through NOR gate 118, to make the gates 120 and 122 also nonconductive. The gate 124, however, is made conductive. This initiates the discharge mode of the integrating operation.

In this mode the selected discharge voltage from the voltage divider 136, as determined by the position of the switch 26a, is supplied through the amplifier 132, the gate 124 and the selected variable resistance 130a, 130b, 130c or 130d to the corresponding integrating capacitor 140, 142, 144 or 146 as selected by the position of the switches 26b and 26c. The discharging voltage is of a polarity which is opposite to the polarity of the charge in the selected integrating capacitor, and causes the capacitor to discharge at a rate which is determined by its capacitance, the value of its associated resistance 130a, 130b, 130c and 130d, and the magnitude of the discharging voltage. The discharge circuitry is an electrical model of the film's sensitivity to the exposure of the light. By changing the variables of the discharging voltage and the integrating capacitance, the response of the film to the illumination intensity can be analogized. What is measured by the microprocessor is not simply the total integrated value of the sensor current, but the time required to discharge it under certain preset conditions which model the sensitivity of the film to the light.

As long as the selected integrating capacitor is discharging, the output of the comparator amplifier 138 remains negative. At the end of the discharging mode, the output of the amplifier 138 goes positive because the negative input is now lower than the positive input. The positive output from the comparator amplifier 138 is supplied via the terminal RI/08 (INT 1) to the microprocessor 66. During the discharging mode, the microprocessor operates a clock pulse counter so that the count within the counter corresponds to the time required to discharge the integrating capacitor. At the end of the discharging mode as signalled by the positive signal on terminal INT 1, the microprocessor stops the clock pulse counting and causes gates 120 and 122 to become conductive and gate 124 to become an open circuit.

What follows is determined by the program within the microprocessor 66, as will be more fully explained in reference to FIG. 4. Briefly, the microprocessor compares the count within the clock pulse counter to a pre-programmed table of values which direct the control to a set of pre-programmed display instructions corresponding to different clock pulse counts. Each of these instructions, when implemented by the microprocessor, will display a different camera aperture setting on the display segments 16.

Referring now more particularly to FIG. 4, when the microprocessor is first turned on by means of the switch 18, it begins with a start step 162 when the mode switch 18 is turned from the off position to either the single or the multiple mode. The next step in the microprocessor program is to load the look-up table which, it should be understood, is comprised of a plurality of random-acess memory elements, from a preprogrammed data stored in read-only memory units within the microprocessor. The next step is to inquire via the INTO input to the microprocessor 66 whether a flash of illumination has occurred. Assuming that the answer is no, the microprocessor repeats the step 166 until it has determined that a flash has taken place. Once a flash has been detected by the sensor 14, the INTO terminal goes high and the microprocessor proceeds to step 168 where all output lines RI/01 through RI/08 and DI/00 through DI/07 are made low, i.e., they are zeroed.

The microprocessor then sets an internal clock to a delay of 1/125th of a second at step 170 and proceeds to step 172. At step 172, the microprocessor inquires through the terminal DI/07 whether the shutter speed switch 28 is set to 1/60th of a second or not. If the switch 28 is set to 1/60th of a second, the input line DI/07 will be high, and the microprocessor will again delay 1/125th of a second at step 174, for a total delay of approximately 1/60th of a second. If the input DI/07 is low, the microprocessor skips step 174 and proceeds directly to step 176, which is to set the trigger inhibit line (terminal DI/03) high. It will be remembered that this output pulse is applied to the NOR gate 110 to prevent any further triggering signals from reaching the set input to the flip-flop 105.

Once the trigger inhibit line has been set, the microprocessor proceeds to step 178 which is to set the time line (line 106 connected to terminal DI/04) high. The next step, 180, is to increment an internal register by one. The microprocessor thereafter inquires, at step 182, on its input terminal INT 1, whether the integrating capacitor discharge has been completed. Until the discharge is complete, the terminal INT 1 will be low and the microprocessor will continue to loop back to step 180. Since the repetition of the cycle is under the control of the internal clock of the microprocessor, it takes place at regular clock pulse intervals. Thus, incrementing the register effectively counts the clock pulses or, more appropriately, it can be thought of as a timer of the period during which the integrating capacitor is discharged. The count in the register when INT 1 goes high will correspond to the time required to discharge the integrating capacitor.

Once the discharging process has been completed, the microprocessor proceeds to step 184 where it resets the time line 106, connected to the terminal DI/04, to low to cause the gates to return to the zeroing mode of operation, as previously described.

With the resetting of the time line 106 to a low state, the microprocessor next inquires of its terminal DI/05 whether or not the switch 18 has been thrown to the single or to the multiple mode. If DI/05 is low, indicating single mode operation, the microprocessor proceeds to step 188. At step 188, it zeros a second internal register (Register 2) and also zeros an internal flash counter. The purpose of the register 2 and the flash counter will be explained in greater detail in reference to the description of the multiple flash program sequence. The contents of the register 2 control the instructions which are given to the display means 16 for displaying camera aperture settings.

Once the microprocessor has zeroed the register 2 and the flash counter in step 188, it proceeds at step 190 to add the contents of register 1 to register 2. It will be remembered that the contents of register 1 correspond to the time required to discharge the integrating capacitor. The microprocessor then zeros register 1 at step 192 and looks up in its preprogrammed table within its random-access memory for the appropriate set of instructions corresponding to the contents of register 2. It does this at step 194 and proceeds to reset the trigger inhibit signal at step 196 on output terminal DI/03 to a low.

The next step at 198 is to display the contents of the flash counter; however, since the contents of the flash counter are zero, the microprocessor skips to step 200 at which it displays the appropriate aperture setting corresponding to the contents of register 2 as determined by the step 194. This aperture setting is presented on the display means 16 for one second. The microprocessor then inquires at step 202 whether the display button 20 is depressed by determining whether or not terminal DI/06 is high. If it is high, meaning that the button has been depressed, the microprocessor returns to step 198 and redisplays the contents of the flash counter and the camera aperture setting. Once it determines that the display switch 20 is not depressed, i.e., the input DI/06 is low, it proceeds to step 204. At step 204, it queries whether the sensor has received a flash. It does this by noting whether or not terminal INTO is low. If not, it returns to step 202. If it is, then the microprocessor returns to step 168 and beings the program again.

Referring again to step 186, if the microprocessor determines that input DI/05 is high, that is, the switch 18 is in the multiple mode, then the microprocessor proceeds to step 206. At step 206, it increments the internal flash counter by one. At the next step 208, it adds the contents of register 1 to register 2. It then zeros register 1 at step 210 and proceeds to step 194, going sequentially through the steps 194 to 204, inclusive, as described above. It should be noted at this point that at step 198, a flash counter has a content of one, and this is presented on the display 16 so that the photographer knows the exposure meter is basing its aperture display on one flash.

At step 204, the microprocessor returns to step 186 with the receipt of the next flash by going through the steps 168-184, inclusive, as previously described.

At step 186, the switch 18 is still in the multiple mode and the microprocessor again increments the flash counter by one, so that its contents are now two at step 206. At step 208, it adds the contents of register 1 to the contents of register 2 which, it will be remembered, contain the count from register 1 produced by the first flash. The contents of register 2 now correspond to the combined pulse count produced by discharging the integrating capacitor for each of two sequential flashes. The contents of register 1 are then zeroed at step 210 and the microprocessor proceeds to step 194.

At step 194, the aperture setting, which is determined by referring to the preprogrammed table, is based on the combined total in register 2. This will, at step 200, produce an aperture display setting which is an accumulated total. Also, at step 198, the contents of the flash counter will be displayed as two. The foregoing sequence of steps will be repeated automatically with each new high intensity flash of the lighting system.

In FIG. 5, the internal contents of the commercially available microprocessor are given in block diagram form. Since these contents are not strictly part of the invention but are provided by the manufacturer of the microprocessor, they will not be described in greater detail. Those skilled in the art will readily understand their function. It should also be apparent that other special-purpose microprocessor circuits can be substituted if appropriate changes are made in the programming.

The foregoing description of the programming of the microprocessor is based on the assumption that the digital exposure meter has been automatically triggered. The same sequence of steps takes place if the manual trigger switch 22 is depressed. All that is accomplished by pushing the trigger switch 22 is to artificially provide the triggering, set signal to the flip-flop 105.

Specific values for the circuit elements have not been given since they would depend on the particular commercially available logic components which are used. The applicant has, however, found that the following values were particularly useful in building a prototype model of the invention:

| Element | Value |
| --- | --- |
| 140 | .0001 microfarads |
| 142 | .0025 microfarads |
| 144 | .01 microfarads |
| 146 | .04 microfarads |

Segments of the resistance bridge 136, beginning at the +3.3 volt supply: 3.15K, 820, 1030, 1300, 1640, 2060, and 115K to produce corresponding voltage taps, beginning at the switch position closest to the +3.3 volt supply, of 0.315 volt, 0.397 volts, 0.5 volts, 0.630 volts, 0.794 volts and 1 volt.

The terms and expressions which have been employed here are used as terms of description and not of limitations, and there is no intention, in the use of such terms and expressions of excluding equivalents of the features shown and described, or portions thereof, it being recognized that various modifications are possible within the scope of the invention claimed.

What is claimed is:

1. Photographic exposure measuring apparatus for determining the intensity of illumination due to high intensity transient illumination and steady state sources of illumination over a preset period of time corresponding to a camera shutter speed, the apparatus comprising photo-optic sensor means for detecting the intensity of illumination and for producing an electrical signal whose magnitude is proportional thereto, means for integrating the sensor signal with respect to time over the preset time period to determine the amount of illumination, control means supplied with the integrated sensor signal information for thereupon producing an output display signal corresponding to the appropriate camera aperture setting for a given film's light sensitivity (film speed), output display means supplied with the display signal for displaying the appropriate camera aperture setting in graphical symbols at least one-half inch wide and one-half inch high, and trigger means supplied with the sensor signal and responsive to a sudden change in it corresponding to a high intensity flash of illumination, for thereafter blocking further sensor signals produced by subsequent flashes until the integration is completed and the corresponding aperture setting is displayed by the output display means.

2. Photographic exposure measuring apparatus as recited in claim 1, wherein the control means further comprise means for accumulating integrated sensor signal information produced by a series of illumination flashes and for producing an output display signal corresponding to the camera aperture setting which is appropriate for a given film sensitivity for the combined, detected flashes of illumination.

3. Photographic exposure measuring apparatus as recited in claim 2, wherein the control means include means connected to the trigger means for counting the illumination flashes and for causing the display means to display the number of flashes counted.

4. Photographic exposure measuring apparatus as recited in claim 1, wherein the sensor detects light principally along one axis and the apparatus further comprises a housing enclosing the sensor, the housing having at least one side wall parallel to the axis of light detection and an end wall perpendicular to it, a light diffuser window in the side wall for diffusing and admitting incident light into the housing, a neutral density filter-window in the end wall and aligned with the light detection axis for admitting reflected light into the housing, a mirror hinged within the housing and movable between a first position in which it blocks light from entering the housing through the light diffuser and a second position in which it blocks light from entering the housing through the filter-window and simultaneously reflects light entering the housing through the light diffuser to the sensor, and means protruding exterior of the housing for manually positioning the mirror in either the first or the second position, whereby the sensor detects reflected light when the mirror is in the first position and incident light when the mirror is in the second position.

5. Photographic exposure measuring apparatus comprising a photo-optic sensor for detecting light and for generating an electrical current whose magnitude is proportional to the intensity of the detected illumination, integrating means for receiving the sensor signal current and for charging a capacitor by applying a current to it which is directly proportional in magnitude to the sensor signal current during a preset time period corresponding to a selected shutter speed, means for discharging the capacitor, a microprocessor, the microprocessor including an internal counter which can be incremented at regular intervals and instruction and stored data memory means for correlating counts in the counter with corresponding discrete, stored display instruction signals representative of camera aperture settings, means for activating the microprocessor to cause the counter to repeatedly increment, at regular intervals, during the discharging of the capacitor, and display means operated by microprocessor in accordance with the display instruction signals corresponding to the counter count for graphically displaying a camera aperture setting corresponding to the count.

6. Photographic exposure measuring apparatus as recited in claim 5, further comprising a plurality of integrating capacitors, means for selecting one of the capacitors to be charged by the applied current, means for applying a select one of a plurality of discharging voltages in opposition to the charge on the capacitor to discharge it, and wherein each combination of a selected discharging voltage and a selected integrating capacitor corresponds to a discrete film sensitivity (i.e., film speed), whereby the displayed aperture setting is correlated to a desired film speed by the selection of the combination of the discharging voltage and the integrating capacitor.

7. Photographic exposure measuring apparatus as recited in claim 5, further comprising triggering means supplied with the sensor signal for detecting a sudden change in the magnitude of the sensor signal current caused by an intense flash of illumination, and for thereupon producing a control signal, and wherein the integrating means include logic means supplied with the first control signal for initiating the charging of the capacitor, the microprocessor is connected to the triggering means, and means controlled by the microprocessor for inhibiting the triggering means from producing a subsequent control signal until after the integrating capacitor is discharged.

8. Photographic exposure measuring apparatus as recited in claim 7, wherein the display means display the camera aperture setting in digits at least one-half inch high by one-half inch wide so as to be readable from distances of at least twenty feet and wherein the light exposure and measuring apparatus can be repeatedly activated and read remotely by generating intense flashes of the illumination to be measured.

9. Photographic exposure measuring apparatus as recited in claim 7, further comprising switch means, which are manually settable in either a single mode or a multiple mode, the switch means when set in the single mode causing the microprocessor to extinguish the previous count in the counter with the generation of each new control signal by the trigger means and the switch means when set in the multiple mode causing the microprocessor to accumulate the count in the counter produced by each of a series of illumination flashes, and to instruct the display means to display an aperture setting appropriate for the total of the illumination flashes.

10. Photographic exposure measuring apparatus as recited in claim 9, wherein the microprocessor includes a flash counter which is incremented by one subsequent to each generation of a control signal by the trigger means and wherein the microprocessor causes the display means to display both the accumulated aperture setting and the count in the flash counter.

11. Photographic exposure measuring apparatus as recited in claim 7, wherein the trigger means are only responsive to flashes of illumination having a rise time from the lowest intensity to the peak intensity of not greater than one five hundredth of a second.

12. Photographic exposure measuring apparatus as recited in claim 5, wherein the sensor detects light principally along one axis and further comprising a housing enclosing the sensor, the housing having at least one side wall parallel to the axis of light detection and an end wall perpendicular to it, a light diffuser window in the side wall, a neutral density filter-window in the end wall and aligned with the light detection axis, a mirror hinged within the housing and movable between a first position in which it blocks light from entering the housing through the light diffuser and a second position in which it blocks light entering the housing through the filterwindow from impinging on the sensor, and means protruding exterior of the housing for manually positioning the mirror in either the first or the second position, whereby the sensor can detect either reflected or incident light, respectively.

13. Photographic exposure measuring apparatus as recited in claim 12, further comprising a second housing in which the display means are mounted and wherein the sensor housing is rotatably mounted on the second housing so as to be rotatable coaxially about the light detection axis.

14. Photographic exposure measuring apparatus as recited in claim 5, wherein the microprocessor includes manually settable means for controlling the length of the time period corresponding to the shutter speed over which the integrating means integrate the sensor signal.

15. A method of automatically measuring the illumination level on a photographic subject, produced by both ambient light and a flash of high intensity light, and displaying a camera aperture setting which is appropriate for the measured illumination, a given film light sensitivity, and a given camera shutter speed, the method comprising the steps of photo-optically sensing the illumination on the subject and producing an electrical signal whose magnitude is proportional to the light intensity;
electronically integrating the electrical signal over a period of time corresponding in length to the desired shutter speed and thereafter producing a digital count which corresponds to the integrated value of the electrical signal;

automatically correlating the count with pre-established, digitally stored camera aperture settings for such numbers to determine the appropriate camera aperture setting for the illumination;

graphically displaying the appropriate camera aperture setting in digits at least one-half inch high by one-half inch wide; and photo-optically sensing a flash of high intensity illumination and repeating the foregoing steps.

16. A method of automatically measuring the illumination level on a photographic subject as recited in claim 15, wherein the sensing step comprises producing an electrical current whose magnitude is proportional to the light intensity and wherein the integrating step comprises charging a capacitor with a current corresponding in magnitude with the sensor current over the period of time corresponding in length to the shutter speed, applying an opposing voltage to the capacitor to discharge it, and measuring the time required to discharge the capacitor by incrementing a digital counter by one at regular intervals during the discharging to produce the digital count which is thereafter correlated with the digitally stored camera aperture settings for such numbers.

17. A method of automatically measuring the illumination level on a photographic subject as recited in claim 16, wherein the combination of the capacitance of the integrating capacitor and the magnitude of the discharging voltage are selected to model the light sensitivity of a particular type of film.

18. A method of automatically measuring an illumination level as recited in claim 15, wherein the step of producing the digital count comprises the steps of accumulating the digital counts produced for a series of flashes of high intensity illumination and automatically correlating the accumulated number with the pre-established, digitally stored camera aperture settings, whereby during the graphic display step the displayed camera aperture setting is appropriate for the accumulated illumination produced during the series of flashes of illumination.

19. A method of automatically measuring an illumination level as recited in claim 18, comprising the further steps of automatically, photo-optically, sensing and then counting the number of illumination flashes and then displaying the flash count number in sequence with the corresponding accumulated aperture setting.

* * * * *